(12) United States Patent
Favret, Jr.

(10) Patent No.: US 6,214,220 B1
(45) Date of Patent: Apr. 10, 2001

(54) COMBINED PROCESS VESSEL APPARATUS

(75) Inventor: Uncas B. Favret, Jr., Covington, LA (US)

(73) Assignee: Engineering Specialties, Inc., Covington, LA (US)

( * ) Notice: Subject to any disclaimer, the term of this patent is extended or adjusted under 35 U.S.C. 154(b) by 0 days.

(21) Appl. No.: 09/451,581

(22) Filed: Nov. 30, 1999

(51) Int. Cl.⁷ ............................................. C02F 1/38
(52) U.S. Cl. ..................... 210/188; 210/256; 210/260; 210/322; 210/512.2; 210/908; 210/DIG. 5
(58) Field of Search ......................... 210/787, 188, 210/256, 260, 319, 322, 512.2, 908, DIG. 5; 406/173

(56) References Cited

U.S. PATENT DOCUMENTS

| | | |
|---|---|---|
| 3,727,382 * 4/1973 | Jackson . | |
| 3,893,318 7/1975 | King, Jr. et al. .......................... | 72/38 |
| 3,893,918 7/1975 | Favret, Jr. ............................... | 210/84 |
| 4,237,006 12/1980 | Colman et al. .......................... | 210/84 |
| 4,243,528 * 1/1981 | Hubbard et al. . | |
| 4,251,366 2/1981 | Simon et al. ............................ | 210/76 |
| 4,252,649 2/1981 | Favret, Jr. ............................... | 210/800 |
| 4,372,757 2/1983 | Favret, Jr. ............................... | 55/172 |
| 4,428,841 1/1984 | Favret, Jr. ............................... | 210/747 |
| 4,447,322 * 5/1984 | Zajdlik . | |
| 4,464,264 8/1984 | Carroll .................................. | 210/512.1 |
| 4,544,486 10/1985 | Carroll .................................. | 210/512.1 |
| 4,576,724 3/1986 | Colman et al. ......................... | 210/788 |
| 4,683,061 7/1987 | Carroll .................................. | 210/512.1 |
| 4,876,016 10/1989 | Young et al. ........................... | 210/739 |
| 4,927,536 5/1990 | Worrell et al. ......................... | 210/512.2 |
| 4,964,994 10/1990 | Wakley et al. ......................... | 210/512.1 |
| 5,132,011 * 7/1992 | Ferris . | |
| 5,225,082 7/1993 | Young et al. ........................... | 210/512.1 |
| 5,344,255 * 9/1994 | Toor . | |
| 5,368,747 * 11/1994 | Rymal, Jr. et al. . | |
| 5,492,622 * 2/1996 | Broussard . | |
| 5,681,458 10/1997 | Favret .................................. | 210/221.2 |

\* cited by examiner

*Primary Examiner*—David A. Simmons
*Assistant Examiner*—Betsey Morrison Hoey
(74) *Attorney, Agent, or Firm*—Garvey, Smith, Nehrbass & Doody, LLC

(57) ABSTRACT

An apparatus for removing oil or gas from a wastewater flow stream includes a vessel having a vessel wall surrounding an interior. A flow inlet is provided for transmitting wastewater to be treated to the vessel interior. The vessel provides a primary oil outlet and a secondary oil outlet. An oil bucket receives floating oil for transfer to the primary oil outlet. A transversely positioned matrix of media extends across the cross section of the vessel interior to separate the vessel interior into first and second sections. The hydrocyclone separator carries a plurality of de-oiler hydrocyclone liners. The separator is positioned at least partially within and communicates with the vessel interior. The hydrocyclone separator is positioned upstream of the secondary oil outlet and downstream of the matrix of coalescing media. Oil separated by the hydrocyclone liners flows to the secondary oil outlet. Water separated by the hydrocyclone liners flows to the water outlet.

20 Claims, 15 Drawing Sheets

FIG. I.

COMBINED PROCESS VESSEL APPARATUS

CROSS-REFERENCE TO RELATED APPLICATIONS

Not applicable.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to wastewater treatment, particularly to an improved combined process vessel apparatus for separating oil, gas, and solids from influent produced water, such as the wastewater generated from oil and gas well drilling and production operations. More particularly, the present invention relates to an improved combined process vessel apparatus that features primary inlet separation, coalescing media and hydrocyclone separation in a single vessel, saving both platform space and piping.

2. General Background of the Invention

In the oil and gas well drilling industry, offshore platforms that are used in the drilling and production of oil and gas wells generate wastewater material that must be treated. This wastewater material is typically produced water that includes gas and droplets of oil. These droplets of oil must necessarily be removed from the waste stream before the treated water can be recycled or returned to the surrounding marine environment. Indeed, the oil must be removed sufficiently so that the water is clean enough to be discharged into the surrounding marine environment without adversely affecting marine plants and animals.

Patents have been issued that are directed to the concept of cleaning produced water in the oil and gas well drilling and production environment, including e.g., U.S. Pat. Nos. 5,681,458; 4,618,430; 4,428,841; 4,252,649; 4,372,757; and 3,893,318, each of which is incorporated herein by reference.

At times, hydrocyclones have been positioned downstream of the flowline that is discharged from an oil and gas separator. Numerous designs of hydrocyclone separators have been developed and utilized in the production of hydrocarbons from subterranean formations. Hydrocyclone separators are being utilized in more applications in hydrocarbon production due to increased environmental concerns regarding the discharge of oil with produced water into bodies of water. Examples of hydrocyclone separators are disclosed in the following patents, each of which is incorporated herein by reference: U.S. Pat. Nos. 4,237,006; 4,251,368; 4,544,486; 4,576,724; 4,464,264; and 4,683,061.

Other separate vessels that have been used to treat oily wastewater include, for example, gas flotation vessels, skim piles (see U.S. Pat. No. 3,893,918), and closed drain reflux skimmers.

BRIEF SUMMARY OF THE INVENTION

The apparatus of the present invention provides an improved wastewater treatment apparatus that features combined process vessel technology.

The present invention provides an improved wastewater treatment apparatus in the form of a horizontal or vertical vessel that combines many features in one vessel.

The apparatus of the present invention can be used for produced water and open drain cleaning and disposal.

The present invention provides an improved apparatus for removing both oil and gas from a wastewater flow stream. The apparatus includes a vessel having an interior and a vessel wall. A flow inlet transmits wastewater to the vessel interior.

The vessel provides a primary oil outlet and a secondary oil outlet. A primary inlet separation device preliminarily separates gas and oil from wastewater that enters the vessel interior via the flow inlet.

The primary inlet separation device can be used to preliminarily separate gas, oil or solids from the wastewater flow stream that enters the vessel.

Coalescing media is positioned in between the primary inlet separation device and the secondary oil outlet. A de-oiler hydrocyclone separator device comprises one or more hydrocyclone liners positioned within a hydrocyclone separator that is contained within the vessel interior. The hydrocyclone separator devices are positioned upstream of the secondary oil outlet and downstream of the matrix of coalescing media.

The primary inlet separation device is preferably a cyclone type separator device. The vessel can be an elongated, horizontally positioned vessel or an elongated vertically positioned vessel.

The upper end portion of the vessel can include a gas space for collecting gas and a gas outlet fitting for withdrawing gas through the vessel wall at the gas space. A bucket and weir arrangement can be provided to receive and collect oil that enters the interior from the flow inlet. The vessel interior can be maintained at either atmospheric pressure or pressurized during use.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 10:
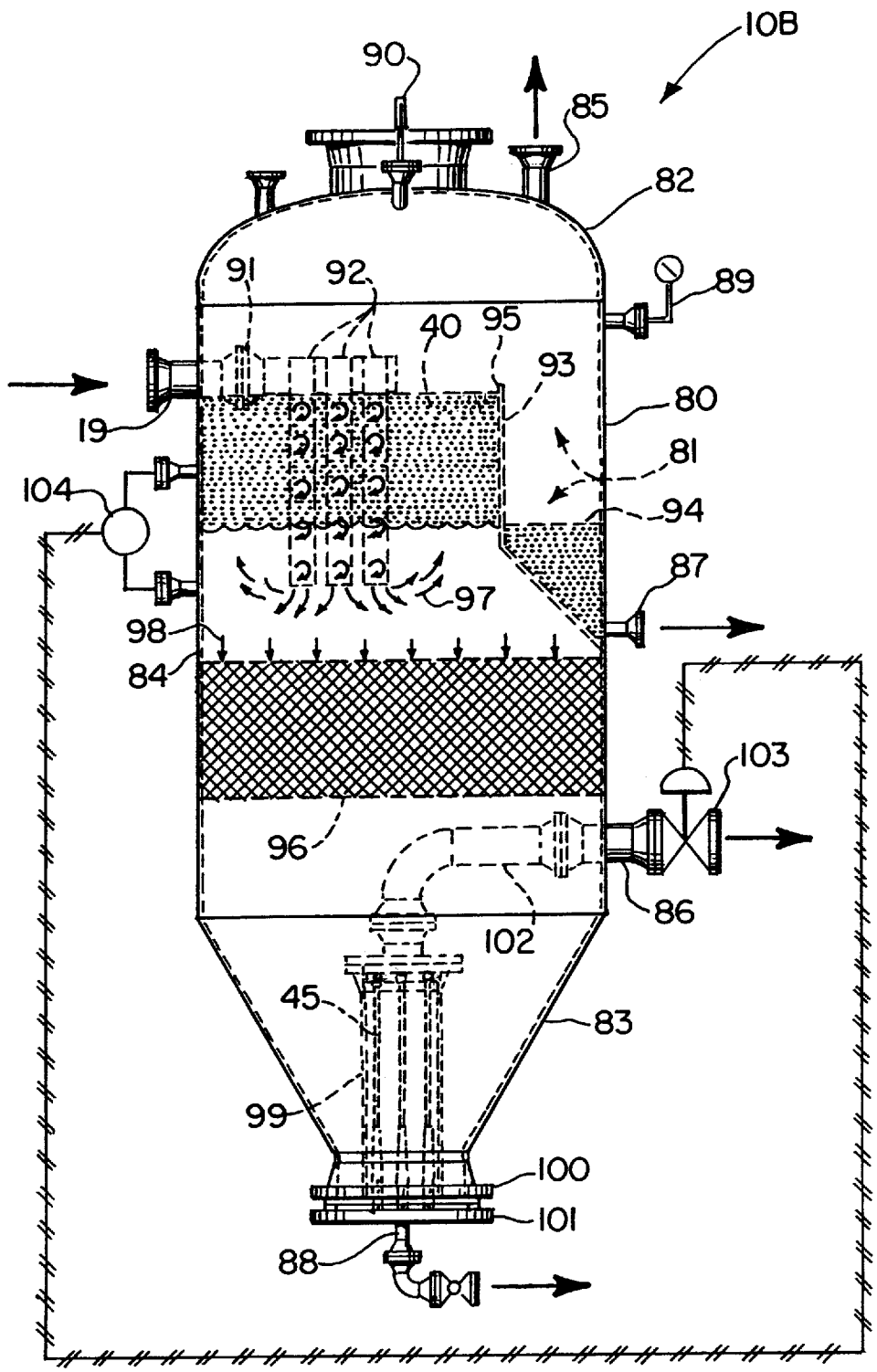
FIG. 10 is a front elevation of a third embodiment of the apparatus of the present invention.
Figure 11:
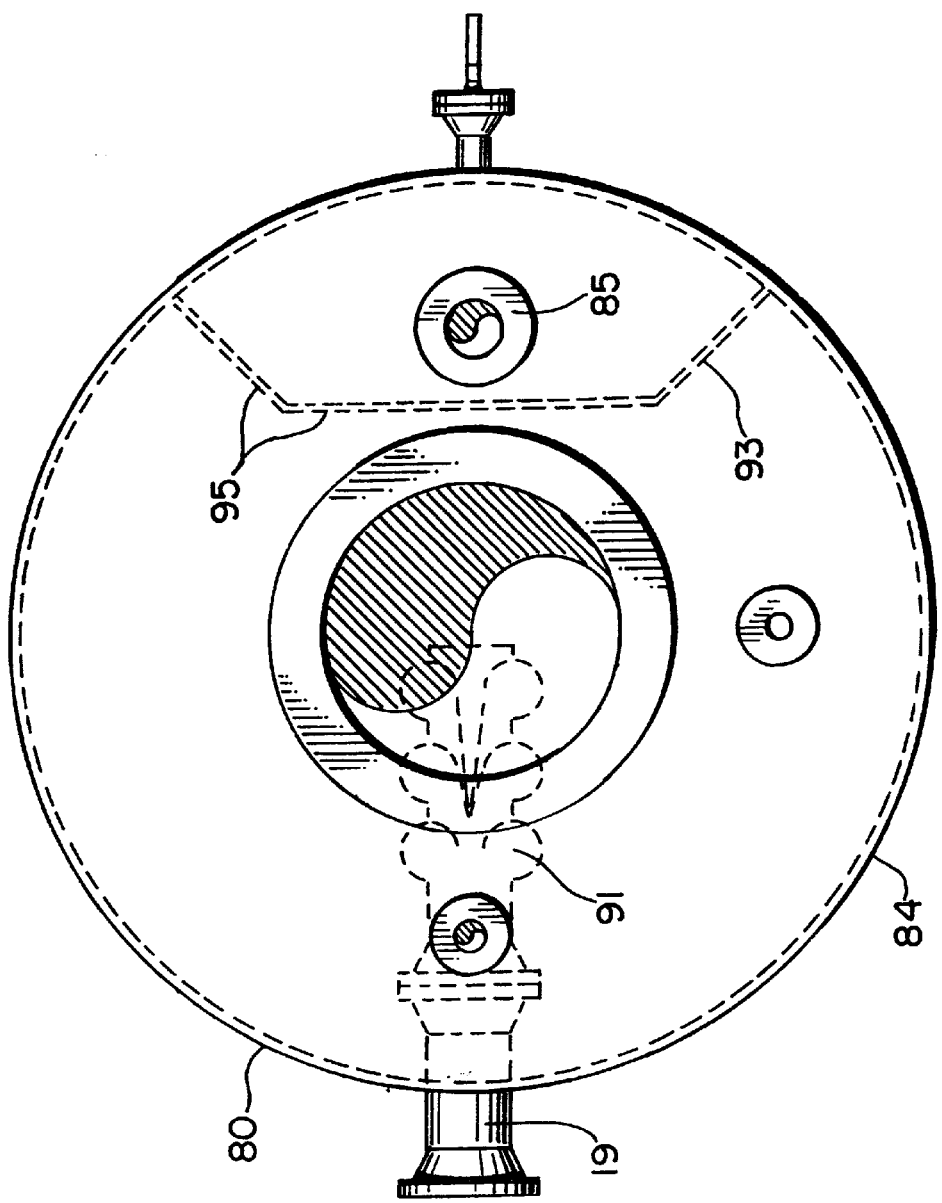
FIG. 11 is a plan view of the third embodiment of the apparatus of the present invention.

FIGS. 1–5 show the preferred embodiment of the apparatus of the present invention designated generally by the numeral 10. Combined process vessel apparatus 10 can be, for example, in the form of a horizontal vessel as shown in FIGS. 1–9, or a vertically oriented vessel as shown in FIGS. 10 and 11.

Figure 1:
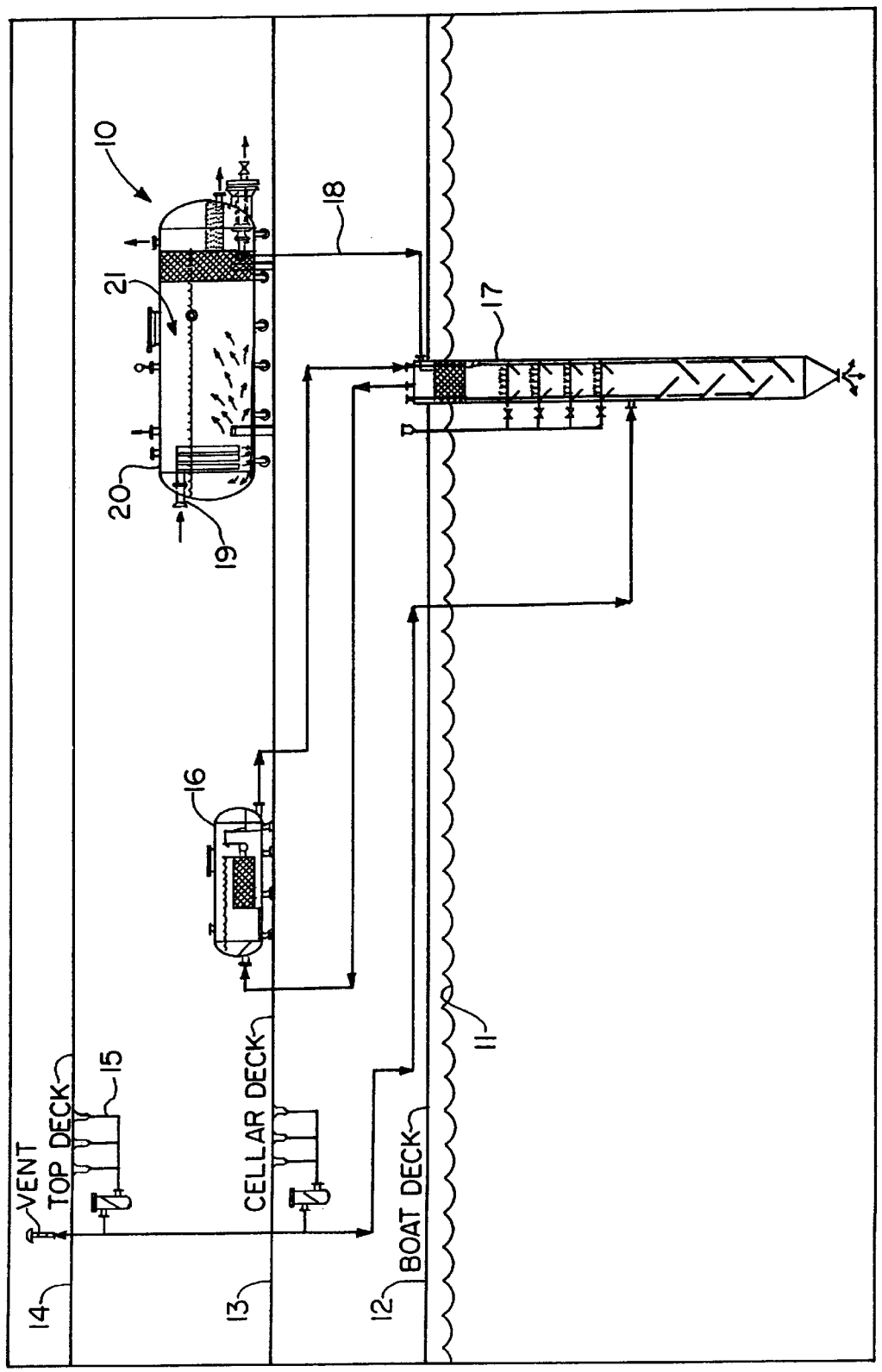
FIG. 1 is a schematic view of the preferred embodiment of the apparatus of the present invention showing three vessels and piping that provide combined process technology for an oil and gas platform.

In FIG. 1, the improved combined process vessel technology of the present invention is generally shown in a flow chart that includes three vessels attached to a marine platform. The marine platform is schematically illustrated in relation to sea level 11, having boat deck 12, cellar deck 13 and top deck 14. In FIG. 1, open drain seals 15 collect wastewater and transmit that wastewater to a vessel that can be a combination flotation pile 17. Reflux skimmer 16 can treat flow that has been transmitted to skimmer 16 from flotation pile 17.

Combined process vessel apparatus 10 (see FIGS. 1–5) receives wastewater at produced water inlet fitting 19. Treated water can be discharged from vessel 10 at water outlet 27 (FIGS. 1–5), and transmitted via flowline 18 (FIG. 1) to flotation-skim pile 17. The details of construction of vessel 10 are shown in FIGS. 2–5. An alternate embodiment is shown as vessel 10A in FIGS. 6–9. Yet another embodiment is shown as vessel 10B in FIGS. 10–11.

Figure 2:
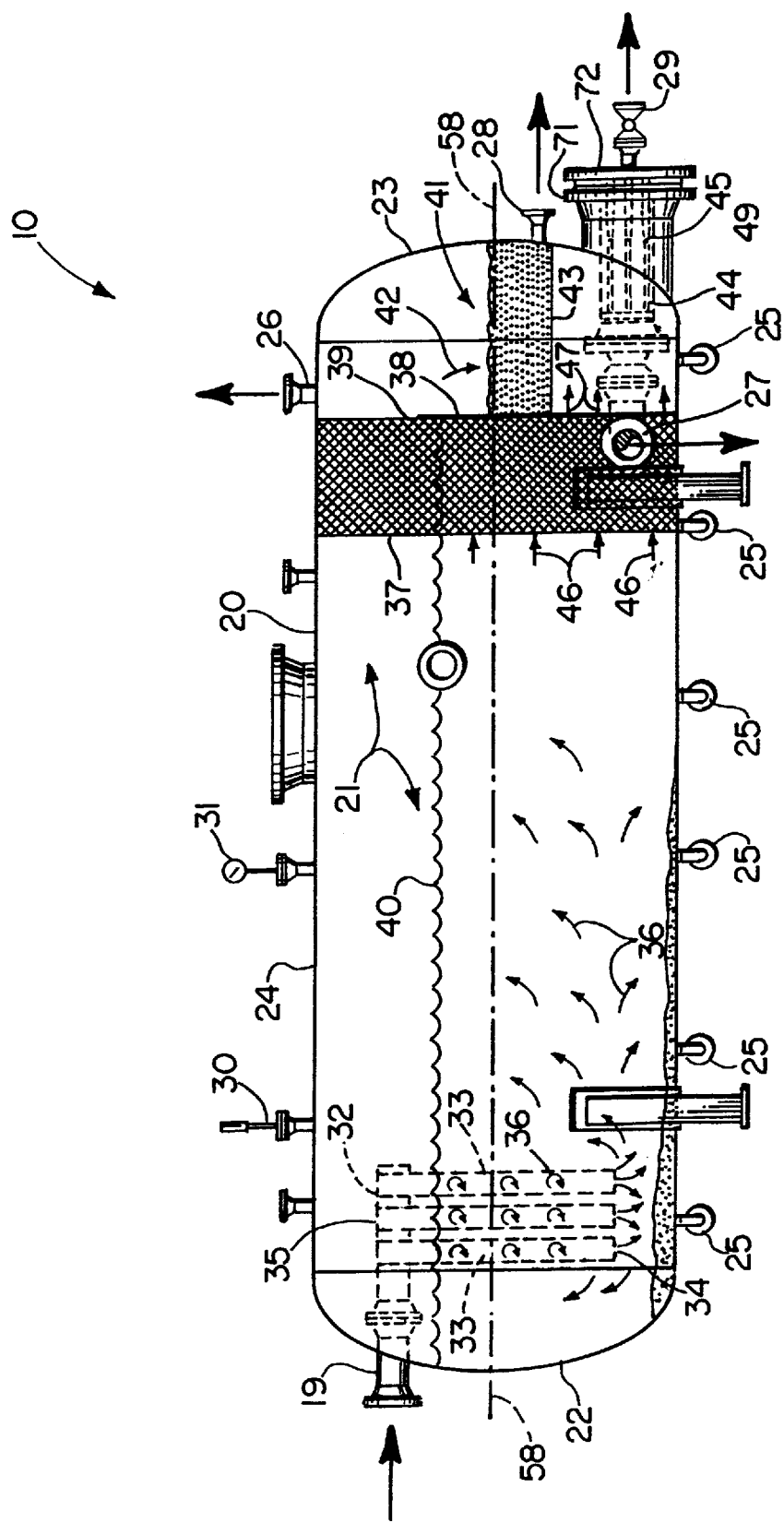
FIG. 2 is a front elevation of the preferred embodiment of the apparatus of the present invention.

In FIGS. 2–5, vessel apparatus 10 has a vessel wall 20 that surrounds vessel interior 21. In FIG. 2, vessel wall 20 can include a cylindrically shaped side wall 24 and a pair of dished ends 22, 23. Solids outlets 25 are provided for discharging settled solids from vessel interior 21. Gas outlet fitting 26 enables removal of gas from the interior 21 of vessel 20. Water outlet 27 removes water from the upper end portion of interior 21 of vessel 10.

A pair of oil outlet fittings 28, 29 are provided on vessel 10. These oil outlet fittings 28, 29 include primary oil outlet fitting 28 and secondary oil outlet fitting 29. Temperature gauge 30 and pressure gauge 31 (FIG. 3) enable temperature and pressure to be monitored for interior 21 of vessel 10. Vessel 10 can be pressurized, or operated at ambient pressure.

Figure 3:
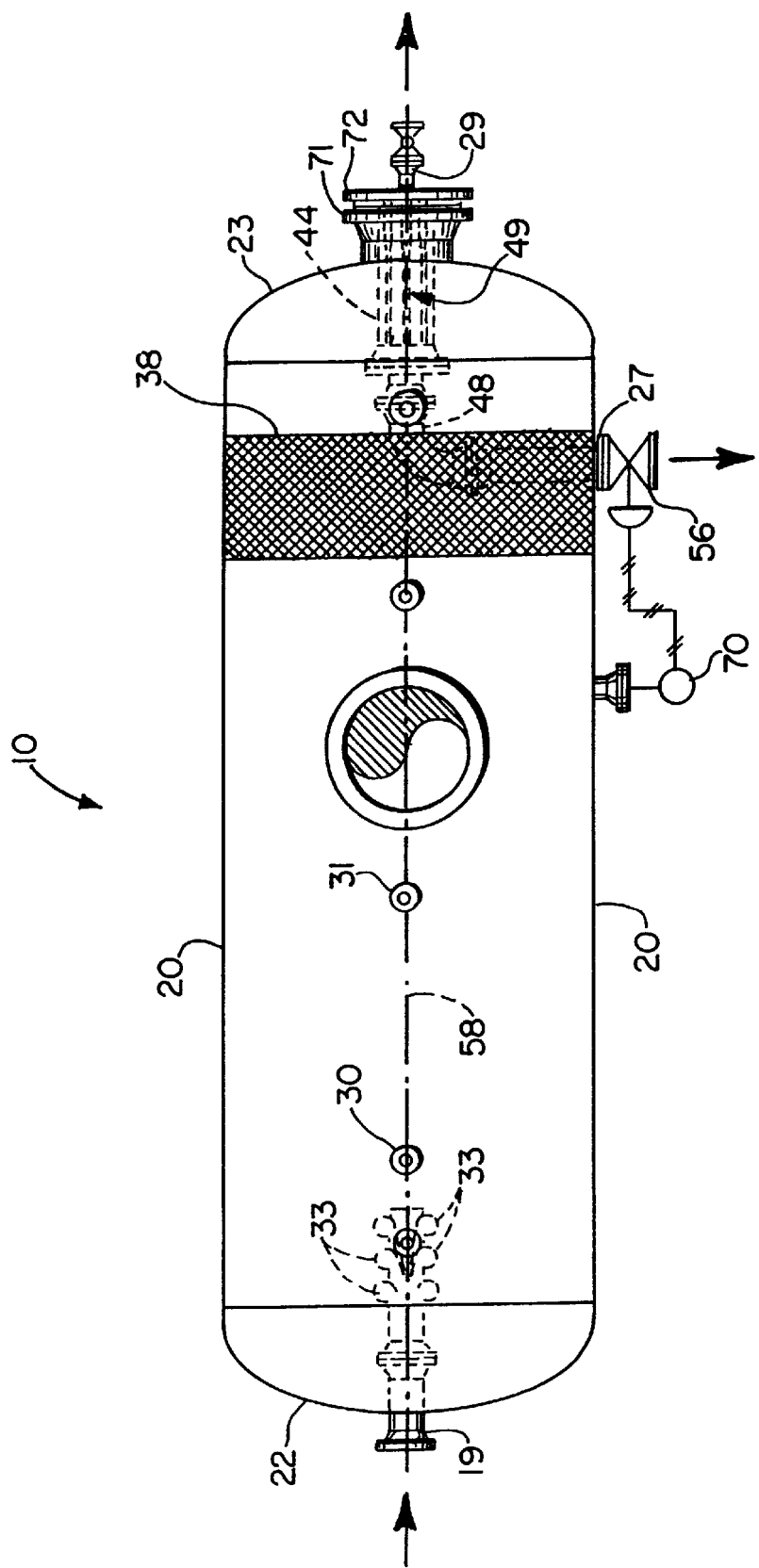
FIG. 3 is a plan view of the preferred embodiment of the apparatus of the present invention.
Figure 4:
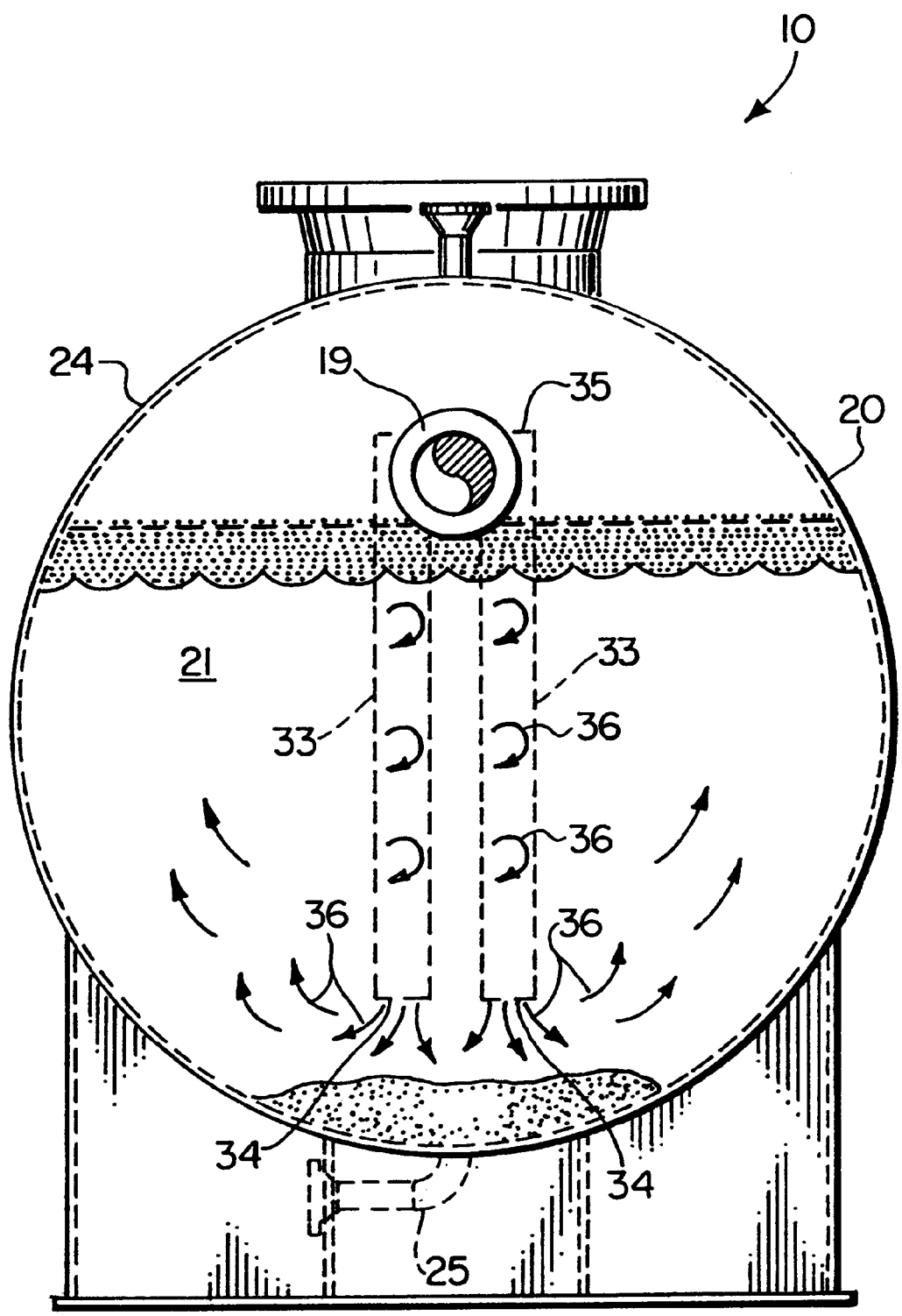
FIG. 4 is an inlet side elevation of the preferred embodiment of the apparatus of the present invention.
Figure 5:
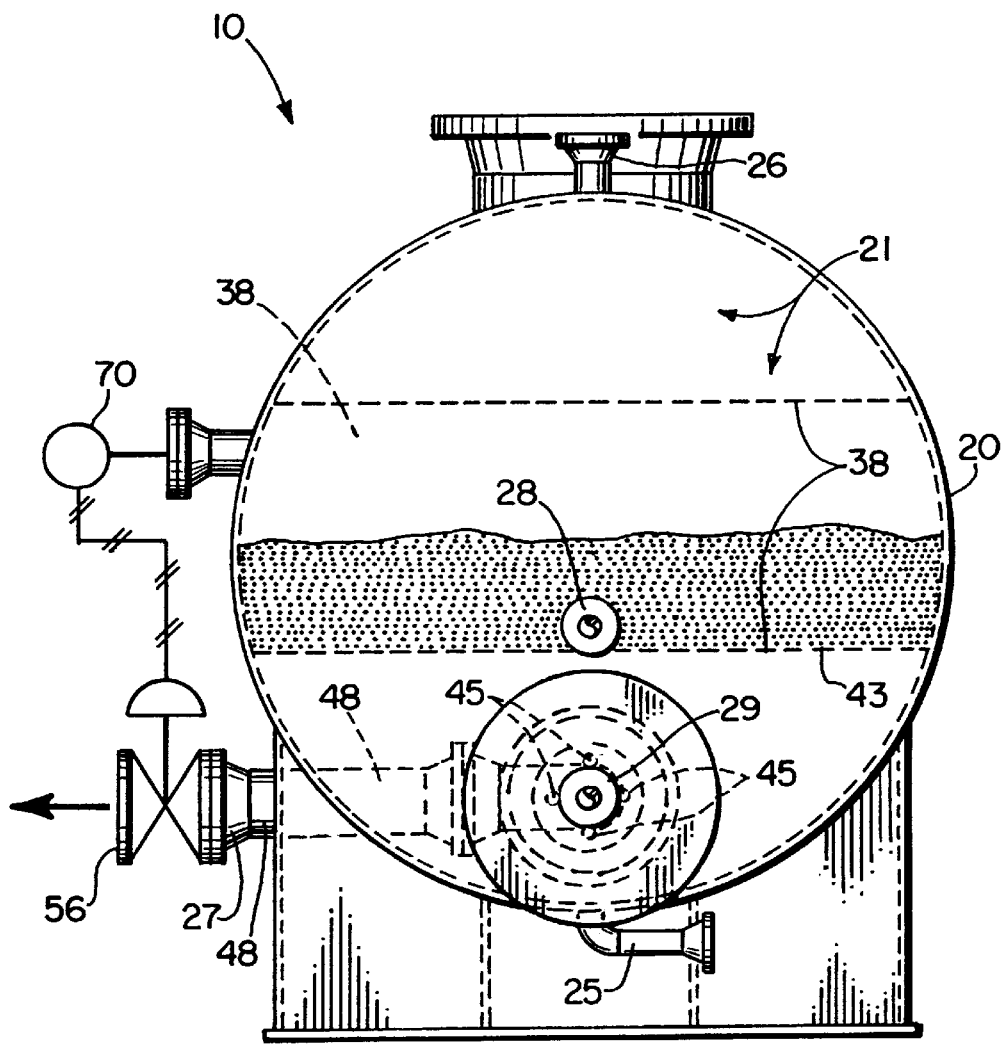
FIG. 5 is the outlet side elevation of the preferred embodiment of the apparatus of the present invention.

The interior 21 of vessel apparatus 10 provides a primary inlet separation device 32 that can be a cyclone device, for example. The primary inlet separation device 32 can be used for degassing, defoaming, oil coalescence, solids separation, flow distribution, or flow surging in any phase. In FIGS. 2 and 3, primary inlet separation device 32 can be comprised of a plurality of cyclones 33. Each of the cyclones 33 has a lower outlet 34 through which water and solids exit. Coalesced oil and gas are discharged at the upper end 35 of each cyclone 33. Arrows 36 in FIGS. 2 and 4 show the flow of water and solids that are discharged from each cyclone 33 via outlet 34.

Baffle plate 38 can be vertically positioned near dished end 23 of vessel wall 20. Internal coalescing media 37 is positioned next to and upstream of baffle plate 38. The upper end of baffle plate 38 defines weir 39. The lower end of baffle plate 38 terminates at longitudinal, preferably horizontally oriented baffle plate 43. Water that exits media 37 can flow under baffle 43 (see arrows 47) to reach hydrocyclone separator 44. Media 37 coalesces oil so that oil separated within media 37 floats to combine with floating oil 40. Floating oil 40 can spill over weir 39 into oil bucket 41 as indicated by arrows 42 in FIG. 2. Oil bucket 41 is a receptacle bordered by baffle plate 38, dished end 23, longitudinal baffle 43, and vessel side wall 24. Oil collected in oil bucket 41 is discharged from vessel interior 21 via primary oil outlet fitting 28 for transfer to a storage tank.

The internal coalescing media 37 can be a matrix media, CPI media, or high density ring type media, as examples. Wastewater that passes through the coalescing media 37 (as indicated by arrows 46, 47) under baffle 43 is separated from some oil that coalesces on media 37. Water that flows through media 37 communicates with hydrocyclone separator 44. The hydrocyclone separator 44 can contain a number of hydrocyclone liners 45 such as the commercially available hydrocyclones that are available from Amoco Production, shown, for example, in U.S. Pat. Nos. 4,876,016, 4,964,994, 4,927,536 and 5,225,082, each of which is incorporated herein by reference.

Water that passes under baffle 43 and oil bucket 41 enters separator interior 49 and then flows into the plurality of hydrocyclone liners 45 contained within interior 49 of hydrocyclone separator 44.

Figure 3A:
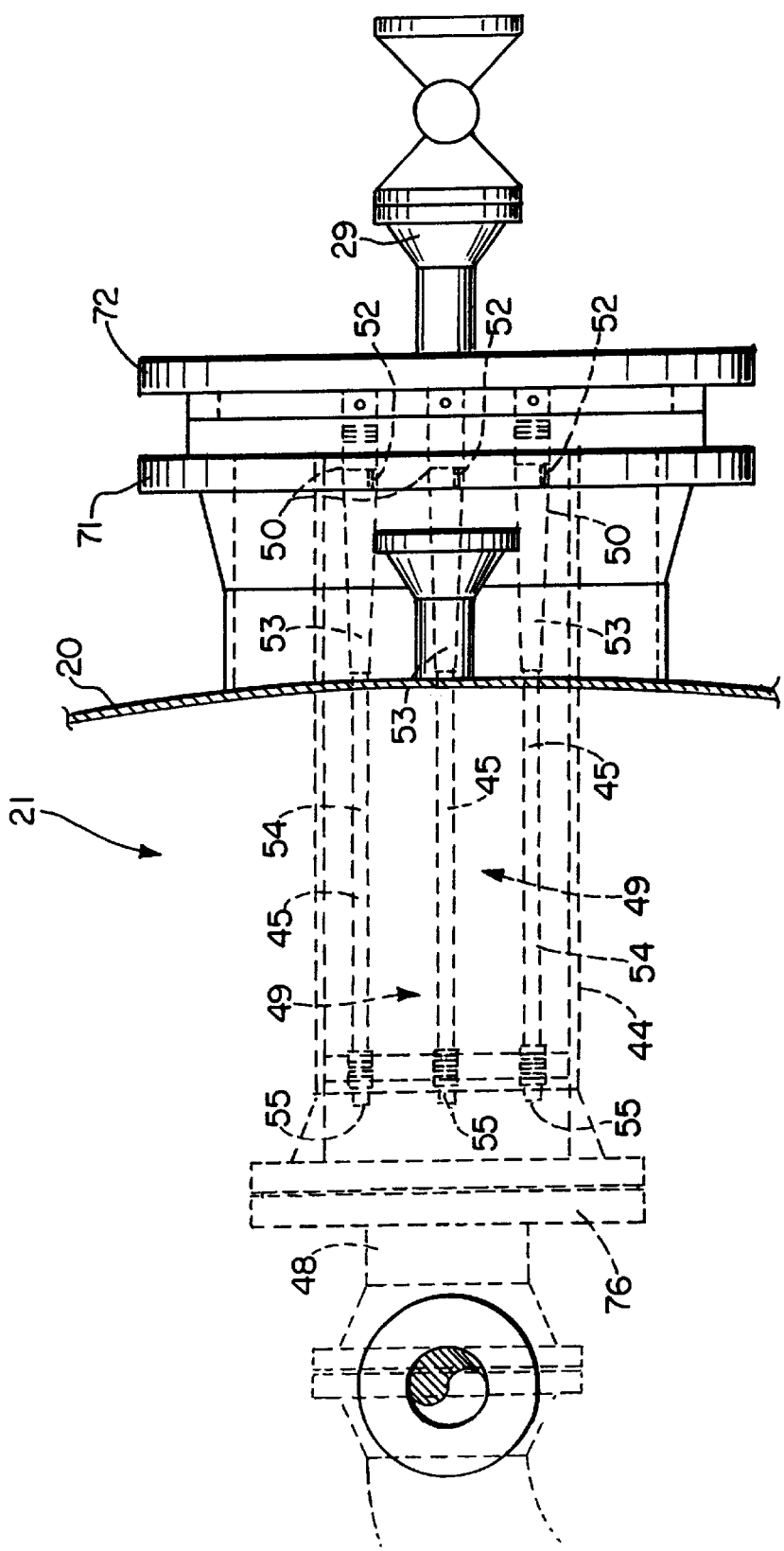
FIG. 3A is a fragmentary view of the preferred embodiment of the apparatus of the present invention.
Figure 12:
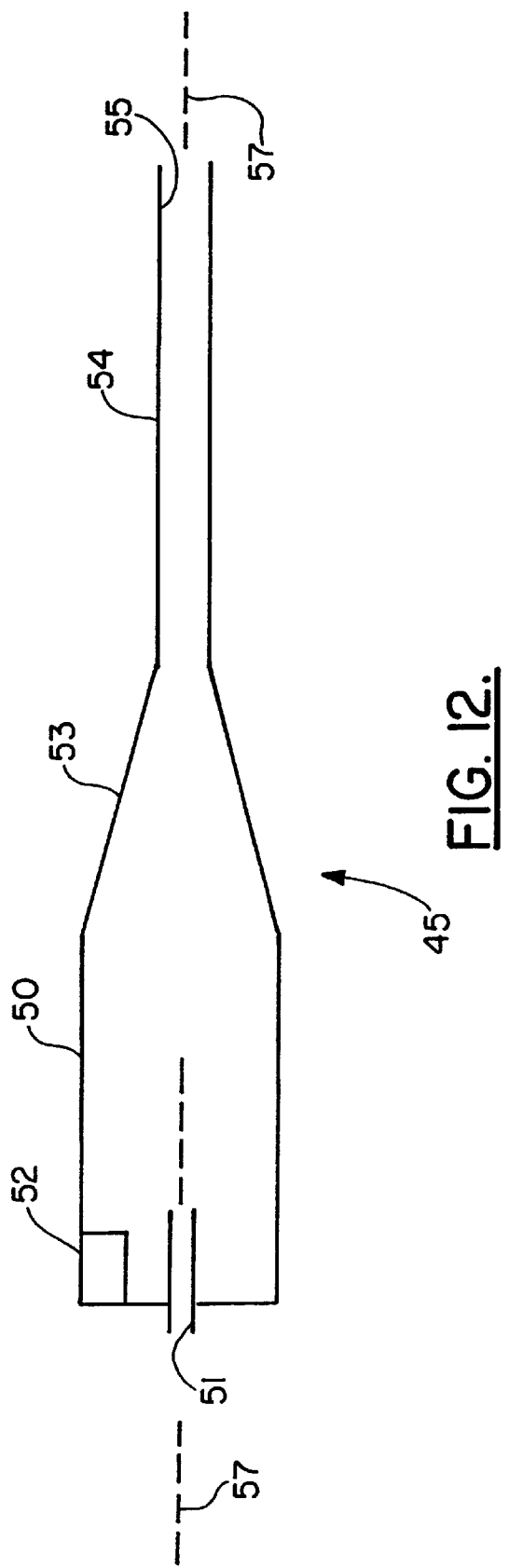
FIG. 12 is a schematic, section view of the hydrocyclone separator portion of the present invention.

Each hydrocyclone liner 45 (see FIGS. 3A and 12) can include a generally cylindrical or larger diameter first portion 50 having a central overflow outlet 51 at a first end thereof, and has at least one tangential flow inlet 52 adjacent the first end thereof. A second end of the substantially cylindrical first portion 50 converges into a conical second portion 53, which in turn converges into a substantially cylindrical third portion 54, which has a central, oppositely located underflow outlet 55.

The tangential flow inlet 52 introduces an oil and water stream from vessel interior 21 and hydrocyclone separator interior 49 into the cylindrical first portion 50 or into the conical second portion 53 in a manner such that the stream will start to spiral immediately. One tangential flow inlet 52 can be utilized; however, a plurality of tangential flow inlets 52 can be utilized in the same plane or in a spaced relationship, as is desired.

The fluid exiting the first portion 50 enters the conical portion 53 where the cone angle causes the fluid to spin more rapidly. The spin velocity increase results in greater forces on the oil droplets resulting in the droplets moving to the center and a separation being made. Oil exits at overflow outlet 51. Water exits at overflow outlet 55.

Oil that is separated and which flows through overflow outlet 51 of each hydrocyclone liner 45 is collected in a collection space in between flanges 71, 72. Secondary outlet fitting 29 receives oil from hydrocyclone liners 45 and separators 44 for transfer to a storage tank.

Water that is separated and which flows through underflow outlet 55 exits hydrocyclone separator 44 and enters water discharge header 48 having water outlet fitting 27 at outlet header 48 and then to water outlet 27 and its control valve 56. Level control 70 (FIG. 5) can be used to control the typically very small amount of oil still remaining in water that is discharged through valve 56 for transfer via flowline 18 to flotation pile 17.

In the embodiment of FIGS. 2–5, the central longitudinal axis 57 (FIG. 12) of each hydrocyclone liner 45 is generally parallel to the central longitudinal axis 58 of vessel 10. The hydrocyclone separator 44 is thus longitudinally positioned, aligned with central longitudinal axis 58 of vessel 10.

In the embodiment of FIGS. 6–9, vessel 10A provides a transversely positioned hydrocyclone separator and liner configuration. As with the embodiment of FIGS. 2–5, vessel 10A has a vessel wall 20 with a vessel interior 21 and a central longitudinal axis 58. Vessel wall 20 can have a cylindrical side wall 24 and dished ends 22, 23. As with vessel 10 of FIGS. 2–5, vessel 10A provides solids outlets 25, gas outlet fitting 26, temperature gauge 30, pressure gauge 31, primary inlet separation device 32 having cyclones 33, internal coalescing media, a water outlet, and both primary and secondary oil outlets.

As with the embodiment of FIGS. 2–5, wastewater enters interior 21 of vessel 10A through inlet fitting 19 and primary inlet separation device 32 (e.g. cyclone separators 33). Arrows 36 show the flow path of wastewater through cyclone separators 33 and vessel interior 21 to media 64. Arrows 46 show the position where wastewater enters the upstream side of internal coalescing media 64. Media 64 coalesces oil and gas. Gas exits vessel 10A at gas outlet fitting 26.

Oil bucket 59 is a receptacle defined by longitudinally extending baffle 60, vertical baffles 61, 62, and side wall 24. The upper end of baffle 61 provides weir 63. Vertical baffle 61 and longitudinally extending baffle 60 abut the downstream side of internal coalescing media 64. Floating oil 40 that accumulates upstream of media 64 spills over weir 63 (see arrows 105, FIG. 6) into oil bucket 59.

Figure 6:
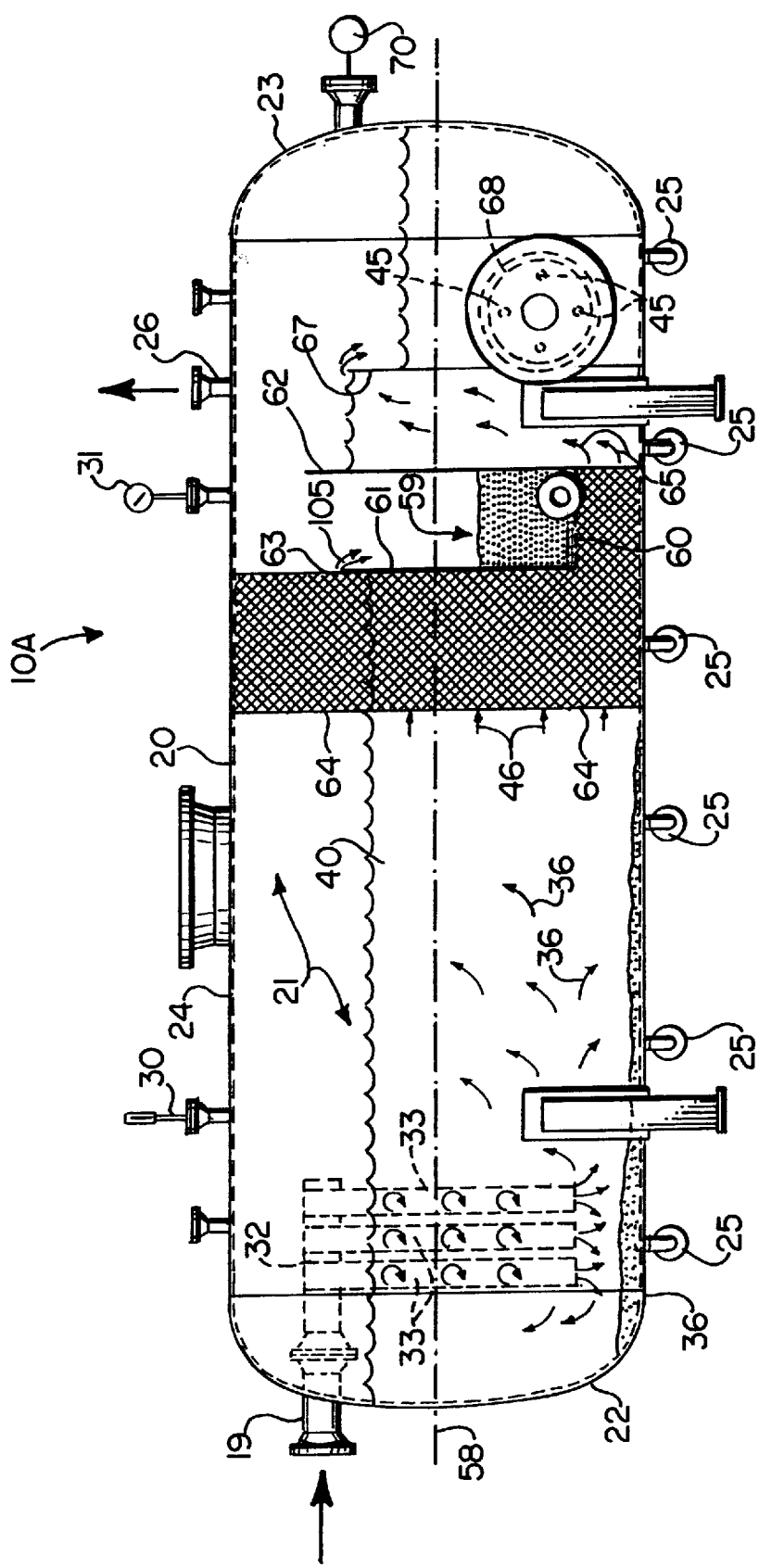
FIG. 6 is a front elevation of a second embodiment of the apparatus of the present invention.
Figure 7:
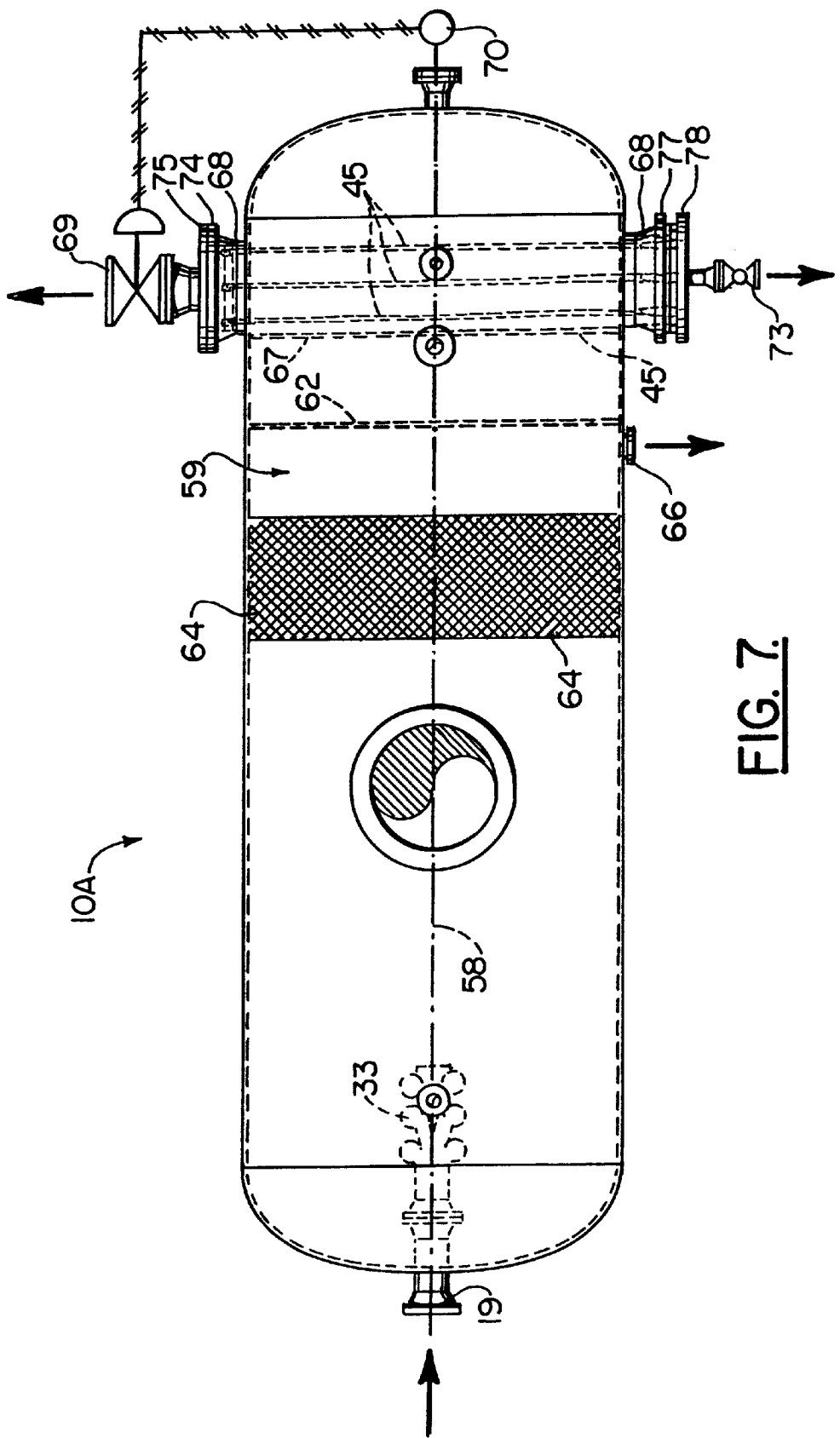
FIG. 7 is a plan view of the second embodiment of the apparatus of the present invention.
Figure 8:
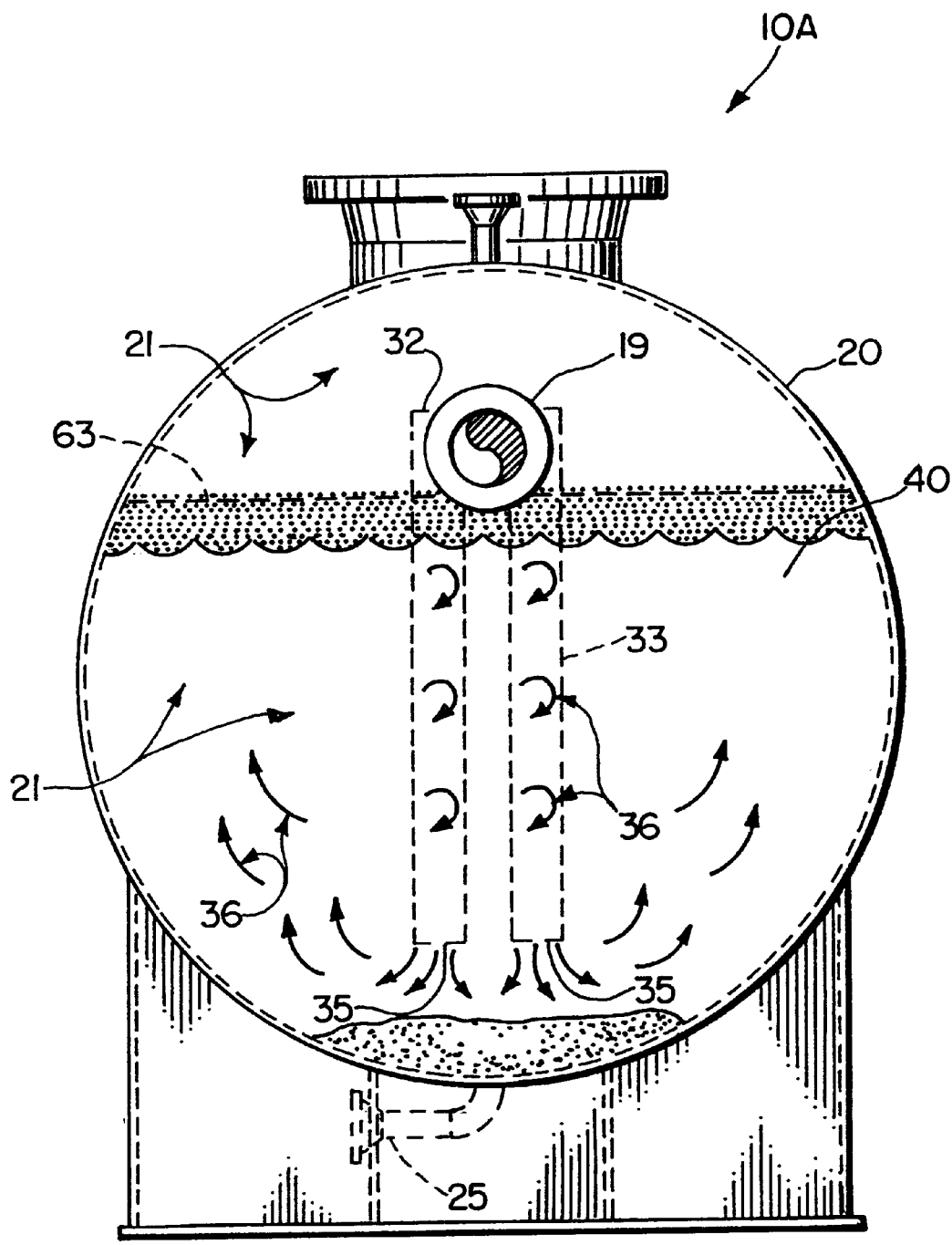
FIG. 8 is an inlet side elevation of the second embodiment of the apparatus of the present invention.

Water exits media 64 below oil bucket 59 and longitudinal baffle 60 as indicated by arrows 65 in FIG. 6. Oil can be withdrawn from oil bucket 59 at primary oil outlet 66 (FIG. 7). Vertical baffle 67 is spaced downstream from baffle 62. Water exiting media 64 flows under baffle 62 and over baffle 67. Hydrocyclone separator 68 is positioned downstream of baffle 67.

As with the embodiment of FIGS. 2–5, a hydrocyclone separator 68 carries one or more hydrocyclone liners 45 (see FIG. 12) that separate any oil not captured by oil bucket 59. Level control 70 can be used to control the flow of water that exits separator 68 via valve 69. Hydrocyclone liners 45 each have one or more flow inlets 52 that communicate with vessel interior 21 downstream of baffle 67.

Figure 9:
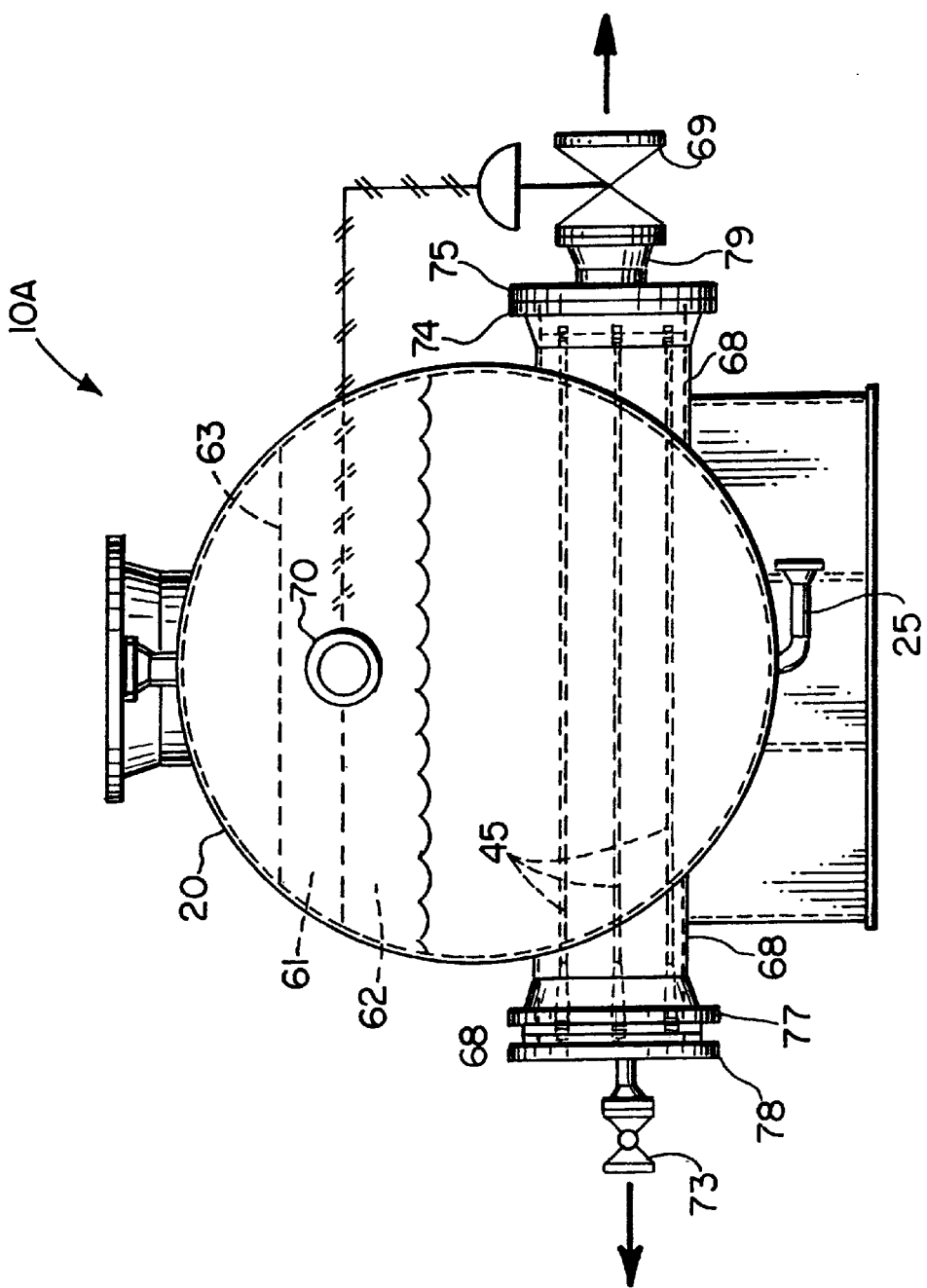
FIG. 9 is the outlet side elevation of the second embodiment of the apparatus of the present invention.
Figure 9A:
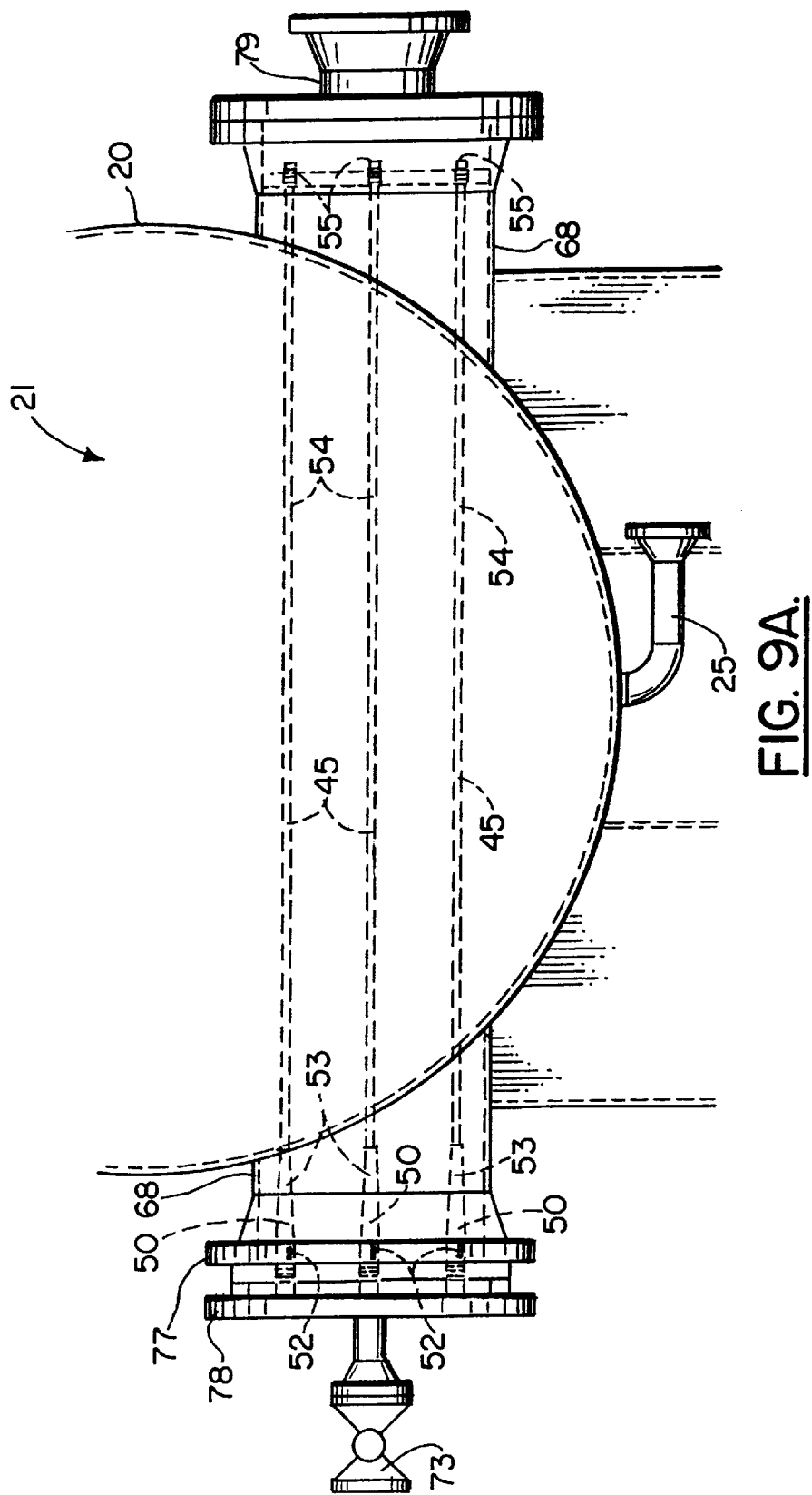
FIG. 9A is a fragmentary view of the second embodiment of the apparatus of the present invention.

In FIGS. 6–9, hydrocyclone separator 68 is transversely positioned so that the central longitudinal axis 58 (FIG. 12) of each hydrocyclone liner 45 is generally perpendicular or transverse to the central longitudinal axis 58 of vessel 10A. Oil is collected at the outlet 51 of each hydrocyclone liner 45 in a collection space in between flanges 77, 78 for transmission to secondary oil outlet fitting 73. Flange 79 can be used to attach control valve 69 to hydrocyclone separator 68. As with the embodiment of FIGS. 2–5, level control 70 can be used to control the typically very small amount of oil still remaining in the water that is discharged through water outlet 79 (FIG. 9).

Figure 11A:
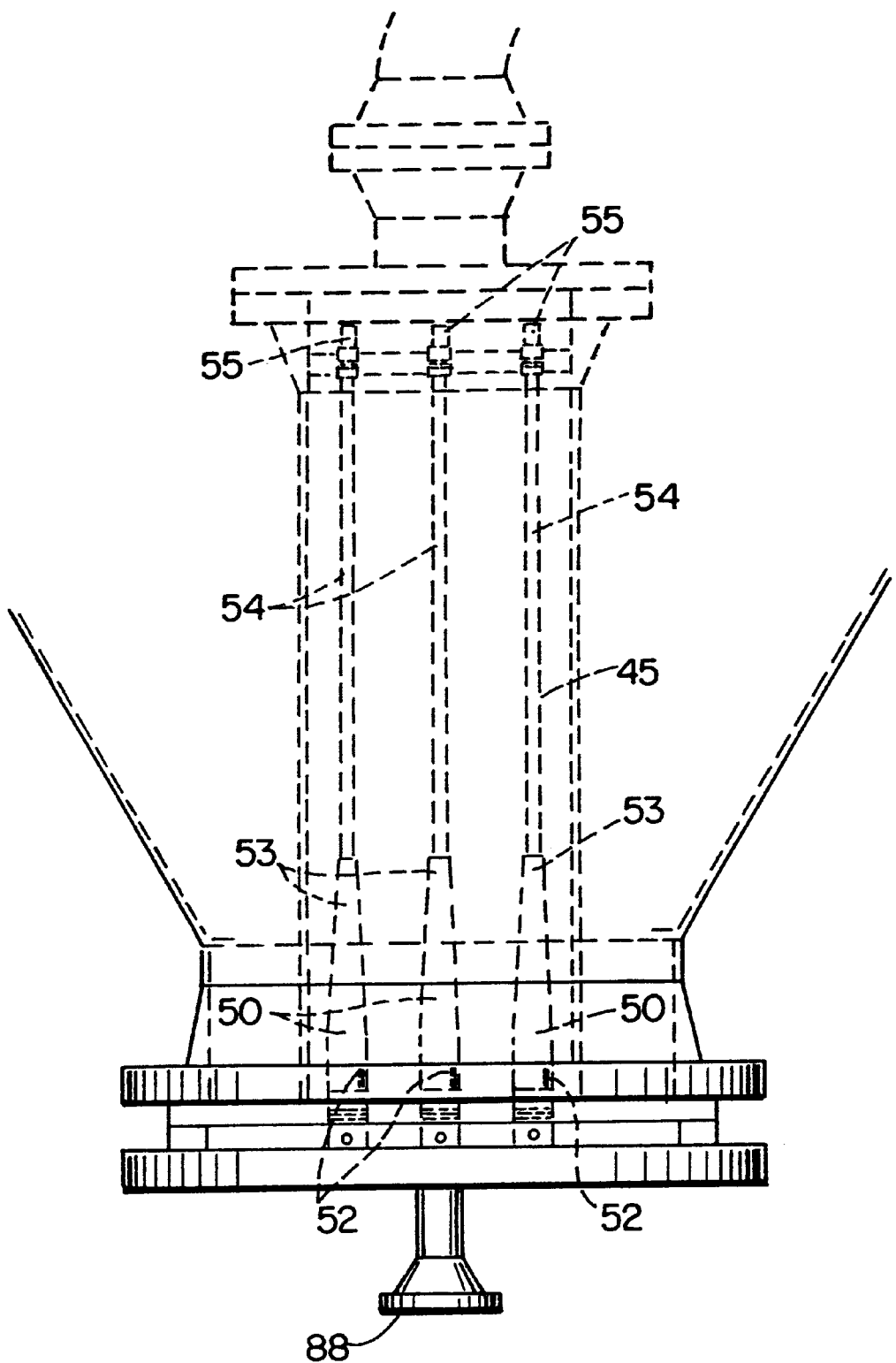
FIG. 11A is a fragmentary view of the third embodiment of the apparatus of the present invention.

In FIGS. 10–11 and 11A, a third embodiment of the vessel apparatus is designated by the numeral 10B. In the embodiment of FIGS. 10–11 and 11A, a vessel 10B is provided which is elongated and vertically oriented. Vessel 10B provides a vessel wall 80 and a vessel interior 81. The vessel 10B has a dished upper end 82 and a frustoconical lower end portion 83. Cylindrical side wall 84 extends between dished upper end 82 and frustoconical lower end 83. As with the first and second embodiments, vessel 10B provides a gas outlet fitting 85, water outlet 86, primary oil outlet fitting 87, secondary oil outlet fitting 88, temperature gauge 89 and pressure gauge 90. As with the embodiments of FIGS. 1–9, vessel 10B has an inlet fitting 19 for receiving wastewater and a primary inlet separation device 91 that can be comprised of a plurality of cyclone separators 92. Baffle 93 forms an oil bucket 94 with generally cylindrically shaped side wall 84. The upper end portion of baffle 93 provides weir 95 that enables oil to float on the opposite side of baffle 93 from oil bucket 94 and above the remaining wastewater contained in vessel interior 81.

Coalescing media 96 is positioned below primary inlet separating device 91 and above frustoconical section 83. With the embodiment of FIGS. 10–11 and 11A, water flows downwardly after leaving cyclone separators 92 as indicated by arrows 98 in FIG. 10. Arrows 97 schematically illustrate the upward movement of oil droplets after they have coalesced within cyclone separators 92. The oil droplets move upwardly, and the remaining wastewater moves downwardly in the direction of arrows 98 and through coalescing media 96. At the lower end portion of vessel 10B, wastewater enters hydrocyclone separator 99. As with the embodiments of FIGS. 1–9, hydrocyclone separator 99 contains a plurality of hydrocyclone liners 45 (see FIG. 12). Oil that exits each hydrocyclone liner 45 is collected in a space in between flanges 100, 101, then flowing to secondary oil outlet 88. Water that exits via outlets 55 of hydrocyclone liners 45 enters discharge header 102 and water outlet 86 to control valve 103. Level control 104 can be used to control the specific amount of oil (typically very small) contained within the wastewater that exits control valve 103 to be transmitted to flotation pile 17.

The following table lists the parts numbers and parts descriptions as used herein and in the drawings attached hereto.

PARTS LIST

| Part Number | Description |
| --- | --- |
| 10 | combined process vessel apparatus |
| 10A | combined process vessel apparatus |
| 10B | combined process vessel apparatus |
| 11 | sea level |
| 12 | boat deck |
| 13 | cellar deck |
| 14 | top deck |
| 15 | open drain seal |
| 16 | reflux skimmer |
| 17 | flotation pile |
| 18 | flow line |
| 19 | produced water inlet fitting |
| 20 | vessel wall |
| 21 | vessel interior |
| 22 | dished end |
| 23 | dished end |
| 24 | cylindrical side wall |
| 25 | solids outlet |
| 26 | gas outlet fitting |
| 27 | water outlet |
| 28 | primary oil outlet fitting |
| 29 | secondary oil outlet fitting |
| 30 | temperature gauge |
| 31 | pressure gauge |
| 32 | primary inlet separation cyclone device |
| 33 | cyclone separators |
| 34 | outlet |
| 35 | upper end of cyclone separators 33 |
| 36 | arrow |
| 37 | internal coalescing media |
| 38 | baffle plate |
| 39 | weir |

-continued

PARTS LIST

| Part Number | Description |
|---|---|
| 40 | floating oil |
| 41 | oil bucket |
| 42 | arrow |
| 43 | longitudinal baffle |
| 44 | hydrocyclone separator |
| 45 | hydrocyclone liner |
| 46 | arrow |
| 47 | arrow |
| 48 | discharge header |
| 49 | separator interior |
| 50 | first portion of hydrocyclone liners 45 |
| 51 | overflow outlet |
| 52 | tangential flow inlet |
| 53 | conical second portion of hydrocyclone liners 45 |
| 54 | third portion of hydrocyclone liners 45 |
| 55 | underflow outlet |
| 56 | control valve |
| 57 | central longitudinal axis |
| 58 | central longitudinal axis |
| 59 | oil bucket |
| 60 | baffle |
| 61 | baffle |
| 62 | baffle |
| 63 | weir |
| 64 | internal coalescing media |
| 65 | arrow |
| 66 | primary oil outlet fitting |
| 67 | baffle |
| 68 | hydrocyclone separator |
| 69 | valve |
| 70 | level control |
| 71 | flange |
| 72 | flange |
| 73 | secondary oil, outlet fitting |
| 74 | flange |
| 75 | flange |
| 76 | flanged outlet |
| 77 | flange |
| 78 | flange |
| 79 | water outlet |
| 80 | vessel wall |
| 81 | vessel interior |
| 82 | dished upper end |
| 83 | frustoconical lower end |
| 84 | cylindrical side wall |
| 85 | gas outlet fitting |
| 86 | water outlet |
| 87 | primary oil outlet fitting |
| 88 | secondary oil outlet fitting |
| 89 | temperature gauge |
| 90 | pressure gauge |
| 91 | preliminary inlet separation device |
| 92 | cyclone separators |
| 93 | baffle |
| 94 | oil bucket |
| 95 | weir |
| 96 | coalescing media |
| 97 | arrow |
| 98 | arrow |
| 99 | hydrocyclone separator |
| 100 | flange |
| 101 | flange |
| 102 | discharge header |
| 103 | valve |
| 104 | level control |
| 105 | arrows |

The foregoing embodiments are presented by way of example only; the scope of the present invention is to be limited only by the following claims.

What is claimed is:

1. An apparatus for removing oil or gas from a wastewater flow stream comprising:

a) a vessel having an interior and a vessel wall;

b) a flow inlet for transmitting a wastewater flow stream to the vessel interior;

c) a primary oil outlet;

d) a secondary oil outlet;

e) a primary inlet separation device that preliminarily separates gas and oil from wastewater that enters the vessel interior via the flow inlet;

f) coalescing media positioned in between the primary inlet separation device and the secondary oil outlet; and g) a de-oiler hydrocyclone liner device that comprises one or more hydrocyclone liner positioned within the vessel interior, upstream of the secondary outlet and downstream of the coalescing media.

2. The wastewater treatment apparatus of claim 1 wherein the primary inlet separation device is a cyclone device.

3. The wastewater treatment apparatus of claim 1 wherein the vessel is a horizontally extended vessel.

4. The wastewater treatment apparatus of claim 1 wherein the vessel is a vertically extended vessel.

5. The wastewater treatment apparatus of claim 1 wherein an upper end portion of the vessel includes a gas space for collecting gas, and a gas outlet fitting for withdrawing gas through the vessel wall at the gas space.

6. The wastewater treatment apparatus of claim 1 further comprising a bucket that receives and collects oil that enters the interior from the flow inlet.

7. The wastewater treatment apparatus of claim 1 wherein the vessel interior is near atmospheric pressure during use.

8. The wastewater treatment apparatus of claim 1 wherein the vessel interior is pressurized during use.

9. The wastewater treatment apparatus of claim 1 wherein the primary inlet separation device has means for separating solids from the wastewater flow stream.

10. The wastewater treatment apparatus of claim 1 wherein the primary inlet separation device has an outlet for discharging solids.

11. The wastewater treatment apparatus of claim 1 wherein the primary inlet separation device comprises a plurality of cyclone separators.

12. The wastewater treatment apparatus of claim 1 wherein the hydrocyclone liners have a diameter of between 1" and 3".

13. The wastewater treatment apparatus of claim 1 wherein the media is a matrix media.

14. The wastewater treatment apparatus of claim 1 wherein the media is comprised of a plurality of high density rings.

15. The wastewater treatment apparatus of claim 1 wherein the media is CPI media.

16. An apparatus for removing oil or gas from a wastewater flow stream comprising:

a) a vessel having a vessel wall surrounding an interior;

b) a flow inlet for transmitting wastewater to be treated to the vessel interior;

c) a primary oil outlet;

d) a secondary oil outlet;

e) a transverse matrix of coalescing media that extends transversely across the cross section of the vessel interior to separate the vessel interior into first and second sections;

f) a de-oiler hydrocyclone liner device that comprises one or more hydrocyclone separators positioned within the vessel interior, upstream of the secondary oil outlet and downstream of the matrix of coalescing media, the hydrocyclone separator device having an inlet that receives fluid within the interior.

17. The waste water treatment apparatus of claim 1 wherein the transverse matrix of media extends across the full cross section of the vessel interior.

18. The wastewater treatment apparatus of claim 16 wherein the hydrocyclone separator has a central longitudinal axis that forms an angle with the central longitudinal axis of the vessel.

19. The wastewater treatment apparatus of claim 16 wherein the hydrocyclone separator has a central longitudinal axis that is generally parallel to the central longitudinal axis of the vessel.

20. An apparatus for removing oil or gas from a wastewater flow stream comprising:

a) a vessel having a vessel wall surrounding an interior;

b) a flow inlet for transmitting wastewater to be treated to the vessel interior;

c) a primary oil outlet;

d) a secondary oil outlet;

e) a transverse matrix of media that extends transversely across the cross section of the vessel interior to separate the vessel interior into first and second sections;

f) a hydrocyclone separator that is at least partially contained within the vessel interior upstream of the secondary oil outlet and downstream of the matrix of media, the hydrocyclone separator containing one or more hydrocyclone liners that separate oil and water, the oil separated by the hydrocyclone liners flowing into the secondary oil outlet.

* * * * *